Nov. 17, 1964 A. A. ARTHUR ETAL Re. 25,687

METHOD AND APPARATUS FOR SOLIDS BLENDING

Original Filed April 26, 1960 3 Sheets-Sheet 1

INVENTORS
ALEXANDER A. ARTHUR
ANDREW L. BOLTON
GEORGE N. BROWN
BY Harry J. McCauley
ATTORNEY

METHOD AND APPARATUS FOR SOLIDS BLENDING

Original Filed April 26, 1960 3 Sheets-Sheet 2

INVENTORS
ALEXANDER A. ARTHUR
ANDREW L. BOLTON
GEORGE N. BROWN
BY Harry J. McCauley
ATTORNEY INVENTORS
ALEXANDER A. ARTHUR
ANDREW L. BOLTON
GEORGE N. BROWN
BY Harry J. McCauley
ATTORNEY United States Patent Office Re. 25,687
Reissued Nov. 17, 1964

25,687
METHOD AND APPARATUS FOR SOLIDS BLENDING

Alexander A. Arthur, Andrew L. Bolton, and George N. Brown, all of Wilmington, Del., assignors to E. I. du Pont de Nemours and Company, Wilmington, Del., a corporation of Delaware Original No. 3,106,385, dated Oct. 8, 1963, Ser. No. 24,707, Apr. 26, 1960. Application for reissue Dec. 4, 1963, Ser. No. 337,117
7 Claims. (Cl. 259—180)

Matter enclosed in heavy brackets [ ] appears in the original patent but forms no part of this reissue specification; matter printed in italics indicates the additions made by reissue.

This invention relates to a method and apparatus for the blending of solids, and particularly to a gravity-flow type of blending wherein solids are withdrawn simultaneously from a multiplicity of levels within the heterogeneous solids mass at points peripherally adjacent thereof, recombined and, optionally, recycled to the vessel one or more times.

Solids blending is desirable in many manufacturing processes, especially those wherein the solids are the products of individual batch operations and, as a result, possess more or less varying properties. A typical example taken from the chemical industry is the manufacture of polyethylene, wherein the product has the form of cubes measuring about ⅛″ on a side. Hitherto it has been the general practice to blend solids with screw type mixers or with elbow type apparatus wherein the emphasis has been on dispersing the solids throughout the entire mass by agitation while confining the entire mass within the vessel. This is objectionable from the standpoint of power consumption, first cost and maintenance cost and, also, intimate blending under these conditions requires a relatively long hold-up time and, even then, the product is usually not blended to a desirable degree of uniformity.

Figure 1:
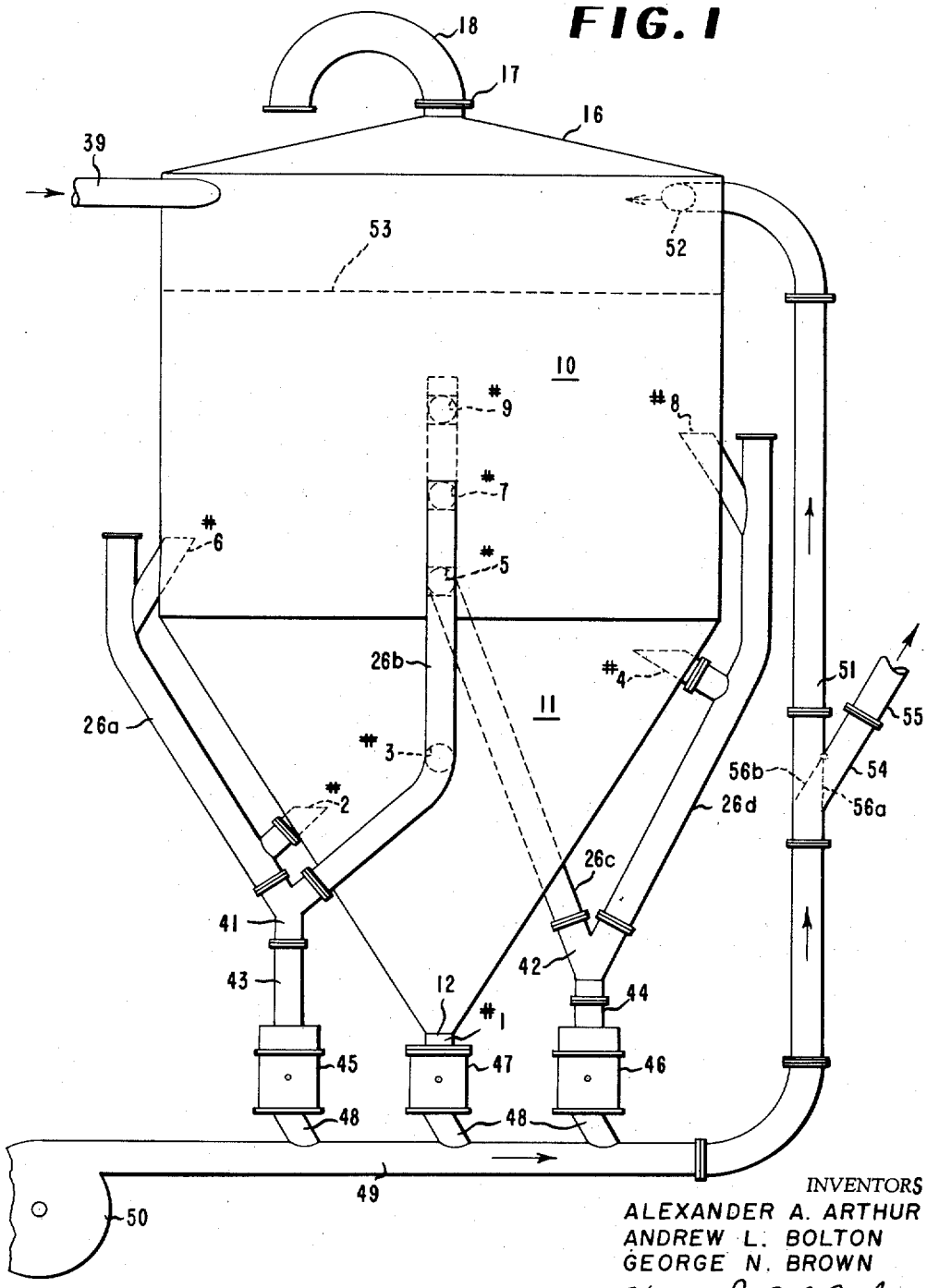
Figure 2:
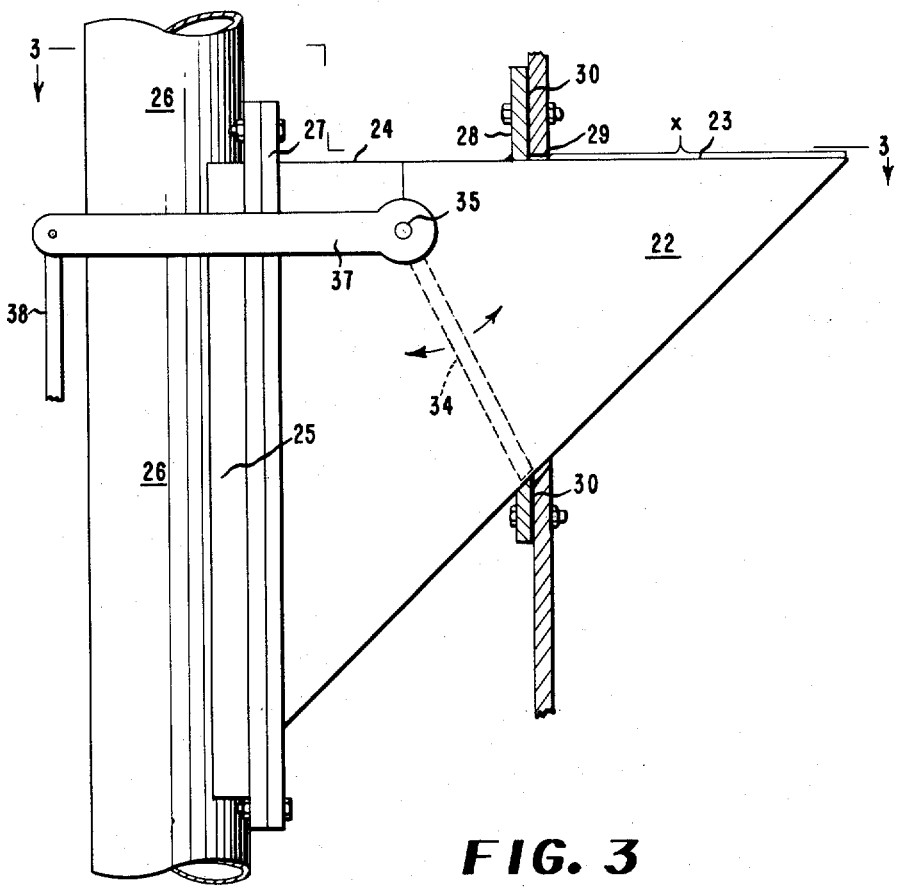
Figure 3:
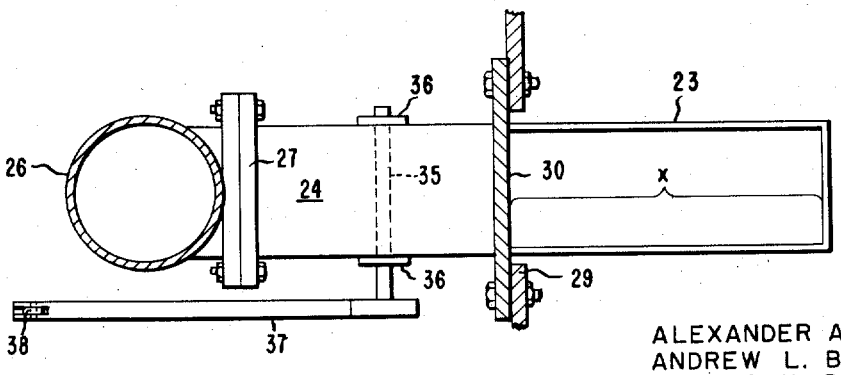
Figure 5:
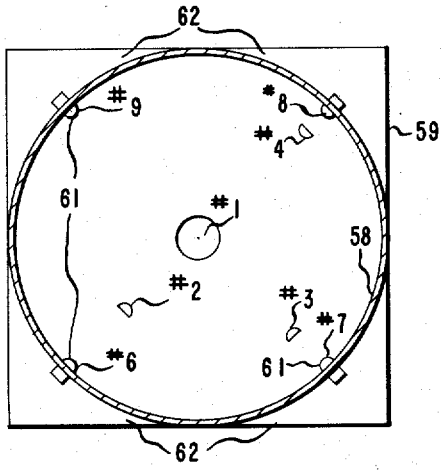
Figure 4:
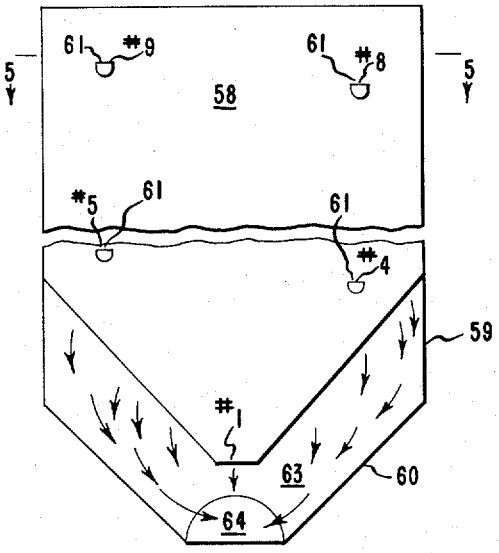

An object of this invention is to provide a method and apparatus for blending which functions entirely by gravity flow, except for the power required to recycle the product, and which is low in first cost and maintenance. Other objects of this invention are to provide a method and apparatus for blending which has an improved blending efficiency, hold-up time, and enlarged capacity per unit volume and of a design such that existing screw type blenders can be very readily converted over should this be desired. The manner in which these and other objects of this invention are attained will become apparent from the following detailed description and the drawings, in which:

FIG. 1 is a side elevation view of a preferred embodiment of blender according to this invention, with all valve details omitted, FIG. 2 is a detailed side elevation view of a solids withdrawal port and associated solids flow control valve for the apparatus of FIG. 1, FIG. 3 is a sectional view taken on line 3—3, FIG. 2, FIG. 4 is a schematic vertical sectional representation of another embodiment of blender according to this invention consisting of a solids containment vessel of the type shown in FIG. 1 enclosed within a square cross section jacket which jacket is closed at the bottom by a section having the form of a frustum of a cone, and FIG. 5 is a section on line 5—5, FIG. 4.

Generally, blending according to this invention comprises confining a mass of the heterogeneous solids in an elevated column, withdrawing from the mass in a generally vertical direction and within about one-fourth of a radius (or within about one-fourth of the distance from the center of the solids mass to the wall of the column where a non-cylindrical column is involved) taken at the level of withdrawal inwardly from the periphery of the mass substantially equal amounts of solids per unit time simultaneously by gravity flow from a multiplicity of regions spaced lengthwise of the solids mass and substantially equiangularly around the periphery of the solids mass, and combining the substantially equal amounts of the solids to produce a solids blend having improved homogeneity of composition.

As will become apparent from the following description, heterogeneous solids which it is desired to blend are first collected together as an elevated column of some height, as by confinement within a standpipe-like vessel, which may have different cross-sections at given points throughout the length but which is preferably generally circular in cross-section throughout. In the course of blending, solids are simultaneously withdrawn from a multiplicity of regions spaced throughout the length of the column and, for best results, it is preferred to preserve a substantially equal solids withdrawal rate for each individual region of the column. It is moreover preferred to effect the solids withdrawal in the vicinity of the periphery of the solids column, although such withdrawal can be made inwardly radially up to about 25% of the column radius at a given level of withdrawal (or up to about 25% of the distance from the center of the solids mass to the wall of the column for non-cylindrical columns) without serious adverse consequences to the blending operation. The fractions of solids withdrawn are thereafter combined to give a product of markedly improved homogeneity which can, however, be measurably improved by one or more repetitions of the cycle.

Best results are obtained by withdrawing solids in a generally vertical direction downwards from the mass accumulation, and thus it is preferred to remove the several solids fractions through openings which have the inlet mouths disposed in a substantially horizontal plane, although it will be understood that some variation is permissible in this regard. However, withdrawal ports flush with the inside wall of the vessel impede free flow of the solids and, in addition, give poorer blends.

In addition, it is very much preferred to effect the solids withdrawal along side-discharging paths, so as to minimize solids hold-up within the vessel as well as facilitate clean-up activities.

Referring to FIG. 1, there is shown a preferred embodiment of blender according to this invention which has a heterogeneous solids capacity of 20,000 lbs. of polyethylene cubes ⅛″ on a side, a commercial product of the chemical industry as hereinbefore mentioned. The blender vessel is made up of a cylindrical section 10 measuring 9′-6″ in inside diameter and 9′-8″ long, which is joined at the bottom to an inverted conical section 11 which is 7′-10″ in length and provided with a 6″ withdrawal port 12 at the bottom, so that the apex angle of section 11 is 60°. The top of section 10 is closed by a dome cover 16 provided with a central connection flange 17 to which is fastened the 180° bend pipe fitting 18 adapted to exhaust conveyer air from the vessel to the atmosphere while barring the entrance of rain or atmospheric dust to the vessel interior.

The blending vessel is provided with nine solids withdrawal ports numbered consecutively in order from the bottommost No. 1, i.e., withdrawal port 12 at the lower end of conical section 11, to No. 9 located about 3′-4″ from the upper end of cylindrical section 10. The term "port" as employed herein is intended to be comprehensive of the entire solids removal conduit interior of the vessel, inclusive, of course, of the inlet opening affording communication with the containment vessel. Viewed from the top, all ports are disposed in a helical pattern, changing into a spiral pattern in the cone bottom, in a clockwise direction 90° apart, those in cylindrical section 10 having a common pitch of 1'-3" measured in a vertical direction. This spacing of 1'-3" is also employed for port No. 4 with respect to port No. 5, the lowermost withdrawal port in cylindrical section 10, but thereafter the pitch distance is increased to a common 1'-9" spacing between ports No. 4 to No. 3, and No. 3 to No. 2, with port No. 1 spaced 3'-9" from the opening of No. 2. It will be understood that the disposition of the withdrawal ports and the patterns of their arrangement can be varied rather widely; however, the described orientation is an economical one, as verified by extensive performance tests.

In this connection it should be mentioned that a 90° angular spacing of ports constitutes a good practical design; however, providing a somewhat greater number of ports at closer angular spacings is advantageous, in that it increases the bin turnover rate as well as reserves to single ports more localized regions of the solids column. On the other hand, it is also possible to increase, to some degree, the angular port spacing within limits which are difficult to generalize because of the complex interrelationship of the properties of the solids in process, such as particle size, shape, cohesion and the like, with the dimensions and shape of the blender vessel.

All of the withdrawal ports are of identical design, as shown in FIGS. 2 and 3, and can conveniently comprise 3" wide chutes 22 having their rectangular open ends 23 disposed in a horizontal plane and extending radially inwards of the vessel walls a distance x, which, in this instance, is about 4.25". The bottoms of chutes 22 are sloped at an angle of 45° for the design depicted, because the polyethylene cube product has an angle of repose of only about 38°. However, it will be understood that this slope can be made much steeper for materials which have a tendency in bulk to bridge or pack. The outside top portions of chutes 22 are closed by plates 24 and the terminal ends 25 are completely open so as to permit free egress of solids from the chutes into 4" vertically disposed collector pipe 26, to which the chute is bolt-attached by flange connection 27. The chutes are in turn secured to the vessel by conventional bolt-secured flanges 28, and the openings 29 in the vessel walls accommodating the chutes are preferably sealed by gaskets 30.

Each chute 22 is provided with an individual throttling valve, which may simply be an angularly movable plate 34 fixedly attached to a rotatable shaft 35 journaled in bearings 36 mounted on the chute side walls. One end of the shaft is lengthened to provide an attachment for lever arm 37 fixedly secured thereto, the outboard end of which has attached thereto a control rod 38, not further shown. The lower ends of control rods 38 extend downwardly to a point where the attending personnel at ground level can conveniently advance or retract the rods appropriately with respect to conventional calibrated valve setting retention plates, not shown, to thereby adjust the solids withdrawal openings to desired size.

The flow of solids from several withdrawal ports can be merged into a single collector pipe 26 and the typical apparatus of FIG. 1 is serviced by a total of only four such pipes, of which 26a receives the solids outflow from ports No. 2 and No. 6, 26b from Nos. 3 and 7, 26c from Nos. 5 and 9, and 26d from Nos. 4 and 8.

In the interests of simplifying the piping as well as to improve the solids admixture, it is desirable to consolidate the flows even more, and this is done by providing the three-branch connectors 41 and 42, the former of which merges the streams from 26a and 26b into a common outlet 43, while the latter merges the output of 26c and 26d to discharge through common outlet 44. Outlets 43 and 44 discharge into the inlet sides of rotary feeders 45 and 46, respectively, which can be commercial 8" x 6" diameter size, such as those marketed by Young Machinery Sales Co., provided with integral adjustable slide gates, not detailed. A third rotary feeder 47 of the same size receives the output from port No. 1 solely, and all three of the feeders discharge through nipples 48 opening into the common 6" conveyor line 49.

It is preferred to utilize pneumatic solids propulsion with the blender of this invention; however, it will be understood that this *is* by no means essential and equivalent devices such as screw conveyers, bucket elevators, belt conveyers or the like can be employed if desired. In any case, a powered conveyer of some kind is necessary to charge the vessel originally, to recycle the solids for more than a single pass through the blender, if this is desired, and as a convienence for removal of the blended product to succeeding process equipment.

In the pneumatic system detailed, a 20 H.P. Ingersoll Rand Co. air blower operating at 1750 r.p.m., indicated generally at 50 and connected with its discharge into conveyer line 49, proved entirely adequate. Additional connections to line 49, not detailed, immediately downstream from the discharge of blower 50, furnish an inlet for initial introduction of the heterogeneous solids charge into the blender or, if desired, the original charging can be effected through a top line 39 supplied from an external source.

The air blast from blower 50 through line 49 entrains solids therein and, with proper valve settings as hereinafter described, impels material into the blender vessel through line 51, which preferably discharges into the top of the vessel through a tangentially oriented discharge opening 52. The entraining air exhausts to the atmosphere through fitting 18, leaving the solids quite evenly distributed over the full charge-level plane, indicated schematically at 53. With some solids it is desirable to provide a multiple number of discharge openings 52, in which case the upper end of line 51 can be manifolded and several branches taken off to discharge at distributed points around the top inside periphery of the vessel.

Line 51 is provided with a commercially available Y-type diverter valve 54 opening into a homogeneous product delivery line 55, so that, when the valve gate is in its right-hand position, 56a, open communication is maintained through line 51 and solids are recycled by blower 50 back to the blender. On the other hand, when valve gate 56 is in its left-hand position, 56b, product is delivered through product delivery line 55 until the blending vessel is completely emptied. If desired, the valve gate can also be positioned intermediate its left-hand and right-hand extremes, thereby obtaining a restricted product delivery accompanied by a recycle of the remaining fraction.

In one type of operation, all withdrawal ports are initially closed completely while the blending vessel is filled to the capacity level indicated at 53 which, in this instance, is about 2' from the upper end of cylindrical section 10 to allow for complete disengagement of solids from the entraining air. All valves are then adjusted by manipulation of control rods 38 to give a substantially equal gravitational solids flow rate through all of the nine solids withdrawal ports, Nos. 1–9, inclusive. It will be understood that the normal flows through these ports are a function of the solids heads thereabove and that the valve of No. 9 can thus be maintained with a larger opening than, for example, No. 5. The aggregate flow through all of the valves should not be greater than the capacity of blower 50 to clear through line 49, so that the blower discharge never becomes choked.

In another type of operation, particularly adapted to the situation where means independent of blower 50 are employed to load the blender initially, as through line 39 hereinbefore described, it is possible to recycle concurrently during the filling of the blender with heterogeneous solids by maintaing the withdrawal ports open in this interval and operating blower 50, thereby reducing the total blending time correspondingly.

Extensive test experience has disclosed that a surprisingly high degree of blending is obtained by even a single discharge of completely segregated solids stocks consisting of successive layers of different colored solids piled one on another. Thus, a single throughput gave complete blending to well within ±2.5%. With single recycle an improvement to within ±2.0% was obtained, whereas the third cycle gave an even higher quality of ±1.5%. This was all accomplished with only the power expenditure required to recycle the product back to the blender for additional passes, and a final quality representing a definite improvement over the best product obtainable with a conventional screw blender was secured with a cycle time saving of 30%.

A typical cycle involved loading the apparatus with all valves 34 closed over a period of 1 hr., blending the full charge over a period of 1 hr., during which 2 passes of the full charge through the blender were completed, and withdrawing the product from the system, which required 1 hr. Thus, the total cycle time for a 20,000 lbs. batch of solids was 3 hrs.

Referring to FIGS. 4 and 5, there is shown a second embodiment of blender according to this invention wherein the piping is considerably simplified by enclosing the entire vessel, identical with that of FIG. 1 and indicated generally at 58, within a jacket 59 drawn to a frustoconical end 60 at the bottom. In this design, the withdrawal ports 61 (again numbered 1 to 9 for ease of relating with FIG. 1) are stub connections provided with any of a wide choice of throttling valves, not shown, which all discharge into a common collection space inclusive of the vertices' clearance 62 together with the jacket-to-cone-bottom interspace indicated generally at 63, as shown by arrow representation. Solids are then withdrawn through discharge opening 64 and either recycled in the manner hereinbefore described or delivered as homogeneous product.

It will be understood that, if desired, a square cross-section vessel 58 can be substituted for the circular cross-section type shown in FIGS. 4 and 5, and this enclosed within a circular cross-section jacket to obtain a continuous surrounding solids collection space; however, the symmetry of lateral solids flow achieved with a circular cross-section construction makes the latter preferred.

Obviously, the blending vessels, the solids withdrawal ports and their patterns of disposition, and the associated auxiliary apparatus employed can all be varied broadly in order to suit specific requirements imposed by product properties, convenience in accommodation to neighboring plant equipment and other considerations. Thus, with a few highly mobile solids it is possible to dispense with all ports in the terminal conical portion 11 of the blender, except the outlet at the apex, although with most substances there exists a more or less stable zone of dormant material at the junction of the cylindrical section 10 with the bottom cone 11, and side-opening ports in the latter operate to move this out. In addition, there is a slow-moving envelope of solids adjacent the inside surface of cone 11, varying from maximum thickness at the top to zero thickness at opening No. 1, the progressive discharge of which is benefited by side openings. The disposition of ports in cone 11 is optional, since the proportionate amounts of solids held stationary in the absence of these ports is small in any case; however, one arrangement which has proved particularly satisfactory is that shown in FIG. 1. Here, three side-opening ports, No. 4, No. 3 and No. 2, are provided 90° apart from one another in a pattern spiraling inwardly of the cone, port No. 4 being disposed about 7% below the junction of cylindrical section 10 with cone 11, while port No. 3 is about 30% below and port No. 2 about 48% below. As a general design, ports spaced 90° apart at the several levels below this junction of 10%, 30% and 50% are advantageous, and, of course, intermediate ports should be additionally provided for very large size blenders for best results.

Similarly, the disposition of ports for cylindrical section 10 can be varied widely; however, we have found that especially good blending is obtained where ports are provided over at least the lower 80% of the length.

It will be further understood that the relative proportions of various parts of the blending vessels can vary widely. As an example, apparatus has been constructed in which the diameter to length ratio of cylindrical section 10 has varied from 1:1 to 1:4 while still preserving a high blending efficiency. As the length increases beyond the 1:4 ratio the relative effect of vertical solids displacement as compared with lateral solids displacement becomes disproportionate and the solids mixing efficiency usually drops. However, the decrease in efficiency resulting is gradual and, moreover, is not inevitably observed, for the reason that the physical attributes of the solids being blended can exert a dominating effect and, thus, in some cases a ratio of 1:5 or even greater could prove preferable.

The reasons for the very marked improvements realized with our invention are not well understood, due to the fact that very complex radial and resultant radial-vertical flow patterns appear to exist within the blender during operation which produce an immediate blending action, as ascertained from examination of test samples withdrawn from collector pipes 26*a*–26*d*. In addition, the air blast entrained recycle effects a further degree of mixing, and the over-all result is an extremely efficient and speedy blending action which is superior to that obtainable with any other equipment known to applicants.

From the foregoing it will be understood that this invention constitutes a considerable improvement in solids blending which can be modified in numerous respects within the skill of the art without departure from the essential spirit, and it is therefore intended to be limited only by the scope of the following claims.

What is claimed is:

1. The method of blending solids comprising confining a mass of the heterogeneous solids in an elevated column, withdrawing from said mass in a generally vertical direction and within about one-fourth of the distance from the center of said mass to the confining wall of said column taken at the level of withdrawal inwardly from the periphery of said mass substantially equal amounts of said solids per unit time simultaneously by gravity flow from a multiplicity of regions disposed lengthwise of said mass and substantially equiangularly around said periphery of said mass, and combining said substantially equal amounts of said solids to produce a solids blend having improved homogeneity of composition.

2. The method of blending solids according to claim 1 wherein said mass of solids is subjected to reblending one or more times.

3. A gravity-flow solids blender comprising, in combination, an elevated vessel provided with a multiplicity of downwardly oriented gravity-flow solids withdrawal ports communicating with said vessel with inlet openings disposed inward of the wall of said vessel up to about 25% of the distance from the center of said vessel to the confining wall of said vessel taken in the general horizontal plane containing said openings at substantially equiangular intervals with respect to one another and spaced lengthwise, individual means adapted to regulate the flow of solids through said withdrawal ports, and means for the common collection of solids escaping through said withdrawal ports.

4. A gravity-flow solids blender comprising, in combination, an elevated vessel having an open cylindrical section joined at the bottom to an inverted conical section provided at the apex with a central drawoff opening, a multiplicity of downwardly oriented gravity-flow solids withdrawal ports communicating with said vessel disposed radially inward of said vessel up to about 25% of the radius of said vessel taken in the general horizontal plane containing said openings at substantially equiangular intervals with respect to one another and spaced lengthwise throughout at least said cylindrical section, *individual means adapted to regulate the flow of solids through said withdrawal ports,* and means for the common collection of solids escaping through said withdrawal ports.

5. A gravity-flow [solid] *solids* blender according to claim 4 wherein the ratio of the diameter of said cylindrical section to the length of said cylindrical section is in the range of about 1 to 1 to about 1 to 4.

6. A gravity-flow solids blender according to claim 4 provided with at least one gravity-flow solids withdrawal port in addition to said central drawoff opening communicating with said vessel in said inverted conical section.

7. A gravity-flow solids blender according to claim 4 wherein said gravity-flow solids withdrawal ports are disposed at a substantially equal vertical pitch in a helical pattern throughout at least the lower 80% of the length of said cylindrical section.

References Cited by the Examiner

The following references, cited by the Examiner, are of record in the patented file of this patent or the original patent.

UNITED STATES PATENTS

| | | |
|---|---|---|
| 1,160,848 | 11/15 | Conklin. |
| 2,292,897 | 8/42 | Neilsen. |
| 2,664,277 | 12/53 | Davies. |
| 2,871,575 | 2/59 | Du Pont. |
| 2,884,230 | 4/59 | Pyle et al. |
| 2,884,231 | 4/59 | Pyle et al. |

FOREIGN PATENTS

| | | |
|---|---|---|
| 255,331 | 1/13 | Germany. |
| 1,082,790 | 6/60 | Germany. |
| 1,085,018 | 7/60 | Germany. |

WALTER A. SCHEEL, *Primary Examiner.*